(12) United States Patent
Paul et al.

(10) Patent No.: US 7,841,646 B2
(45) Date of Patent: Nov. 30, 2010

(54) MOTOR VEHICLE WITH AN AIR-CONDUCTING DEVICE

(75) Inventors: Joachim Paul, Stuttgart (DE); Andreas Dinter, Krailing (DE)

(73) Assignee: Dr. Ing. h.c.F. Porche Aktiengesellschaft (DE)

( * ) Notice: Subject to any disclaimer, the term of this patent is extended or adjusted under 35 U.S.C. 154(b) by 0 days.

(21) Appl. No.: 12/265,180

(22) Filed: Nov. 5, 2008

(65) Prior Publication Data

US 2009/0160215 A1 Jun. 25, 2009

(30) Foreign Application Priority Data

Dec. 20, 2007 (DE) .................. 10 2007 061 812

(51) Int. Cl.
*B62D 35/00* (2006.01)
(52) U.S. Cl. .................. 296/180.1; 296/180.5
(58) Field of Classification Search .............. 296/180.1, 296/180.5
See application file for complete search history.

(56) References Cited

U.S. PATENT DOCUMENTS

| | | | |
|---|---|---|---|
| 4,889,382 A | 12/1989 | Burst et al. | |
| 5,141,281 A * | 8/1992 | Eger et al. | 296/180.5 |
| 7,481,482 B2 * | 1/2009 | Grave et al. | 296/180.5 |
| 2003/0090126 A1 | 5/2003 | Adams | |
| 2007/0236046 A1 | 10/2007 | Froeschle et al. | |

FOREIGN PATENT DOCUMENTS

| | | |
|---|---|---|
| DE | 36 15 584 A1 | 11/1987 |
| DE | 10 2006 011 512 A1 | 9/2007 |
| EP | 1 118 529 | 7/2001 |
| EP | 1 310 421 | 5/2003 |
| WO | WO97/32770 * | 9/1997 |
| WO | 2007/095886 | 8/2007 |

* cited by examiner

*Primary Examiner*—Dennis H Pedder
(74) *Attorney, Agent, or Firm*—Gerald E. Hespos; Michael J. Porco

(57) ABSTRACT

A motor vehicle, especially a passenger car, is provided with an air-conducting device arranged in its rear area. The air conducting device can be moved by way of an adjusting mechanism from a rest position flush with the adjacent body of the rear area into a driven-out operating position. The adjusting mechanism includes two openers arranged in side areas of the air-conducting device for moving the air-conducting device. In order to be able to adjust an air-conducting element continuously from a lowered rest position and a raised operating position, each opener is connected via a swivel-joint on a bearing part that is fastened to the vehicle and aligned vertically.

17 Claims, 6 Drawing Sheets

MOTOR VEHICLE WITH AN AIR-CONDUCTING DEVICE

CROSS-REFERENCE TO RELATED APPLICATION

This application claims priority under 35 U.S.C. §119 to German Patent Application No. 10 2007 061 812.5, filed Dec. 20, 2007, the entire disclosure of which is herein expressly incorporated by reference.

BACKGROUND AND SUMMARY OF THE INVENTION

The invention relates to a motor vehicle, especially a passenger car, having an air-conducting device arranged in its rear area, which can be moved by way of an adjusting mechanism from a rest position running flush with the adjacent body of the rear area into the opposite driven-out operating position.

Providing so-called spoilers in the rear area of a vehicle is known from series production vehicle manufacturing in order to, on one hand, reduce the air resistance coefficient of the vehicle and, on the other hand, to increase the dynamic rear wheel pressure. In addition, supplying the engine that is, for example, mounted in the rear area with cooling air using these types of spoilers and/or air conducting devices is also known.

Moving the air-conducting device by way of an adjusting mechanism from a rest position that is flush with the adjacent vehicle body in the rear area to an operating position that is driven out in comparison to the flush position is known from DE 36 15 584 A1. The adjusting mechanism includes two openers that are arranged in the side areas of the air-conducting device, which openers move the air-conducting device upward or downward.

The object of the invention now consists of further developing a motor vehicle of this general type so that a drivable air-conducting device can be housed in the rear area even when there is a limited amount of construction space.

According to the invention, the object is achieved by providing a motor vehicle, especially a passenger car, having a moveable air-conducting device arranged in its rear area. The air-conducting device extends at a distance to the adjacent body. An adjusting device includes two openers arranged in the side areas of the air-conducting device for moving the air-conducting device, each opener being connected swivel-jointed on a bearing part that is fastened to the vehicle and aligned vertically.

Advantageous designs are described herein.

The core of the invention can be seen in that the openers assigned to the adjusting mechanism arranged in the lateral areas of the air-conducting device are connected so that they are hinged and can rotate about a bearing part. In contrast to the solution demonstrated in the state of the art, the bearing part can be arranged in an essentially vertical direction in the rear area of the motor vehicle. Thus, with appropriate design of the opener, the air-conducting device can be housed in the rear area, even in a position that does not lie directly adjacent to the swivel joint.

Thus, the bearing part can be fastened, for example, on the cross-member arranged under the rear lid. This has the advantage that a reinforcement of the rear area is also achieved.

For preliminary assembly, a drive for the adjusting mechanism, for example, an electric motor, can be fastened on the bearing part. In addition, the openers, including the air-conducting device, can be preassembled on the bearing part and mounted on the cross-member as a module.

For driving the openers, it is provided that the electric motor is connected to the openers by way of flexible shafts. The advantage here is that only one drive is necessary for the two openers and, thus, less construction space is required. At the same time, weight savings can be achieved in this way.

For integrating the opener in the bearing part, on each side an area that is open toward the cross-member can be provided for holding the opener. In this way, the openers are located in the space formed by the bordering walls of the bearing part and of the cross-member.

In a preferred design of the opener, each opener has two control arms that are fastened on one side with a swivel joint on the bearing part, and on the other side, are fastened with a swivel joint on a connecting element. The control arms can be designed with an angled shape. In this way, a stable quadruple joint is produced, such that the air-conducting device is kept at a distance from the body of the vehicle in any position even with strong forces caused by the air flow.

In a preferred design of the invention, it is provided that the connecting element is fastened on the air-conducting device.

A spoiler foot can cover any connecting element with respect to the visible area so that, from the exterior, the drive for the air-conducting device cannot be seen.

In order to achieve a uniform gap dimension in every position of the air-conducting device, the geometry of the spoiler foot can be adjusted to the curve of the bracket and the outlet opening for each connecting element can be adapted to the geometry of the spoiler foot.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
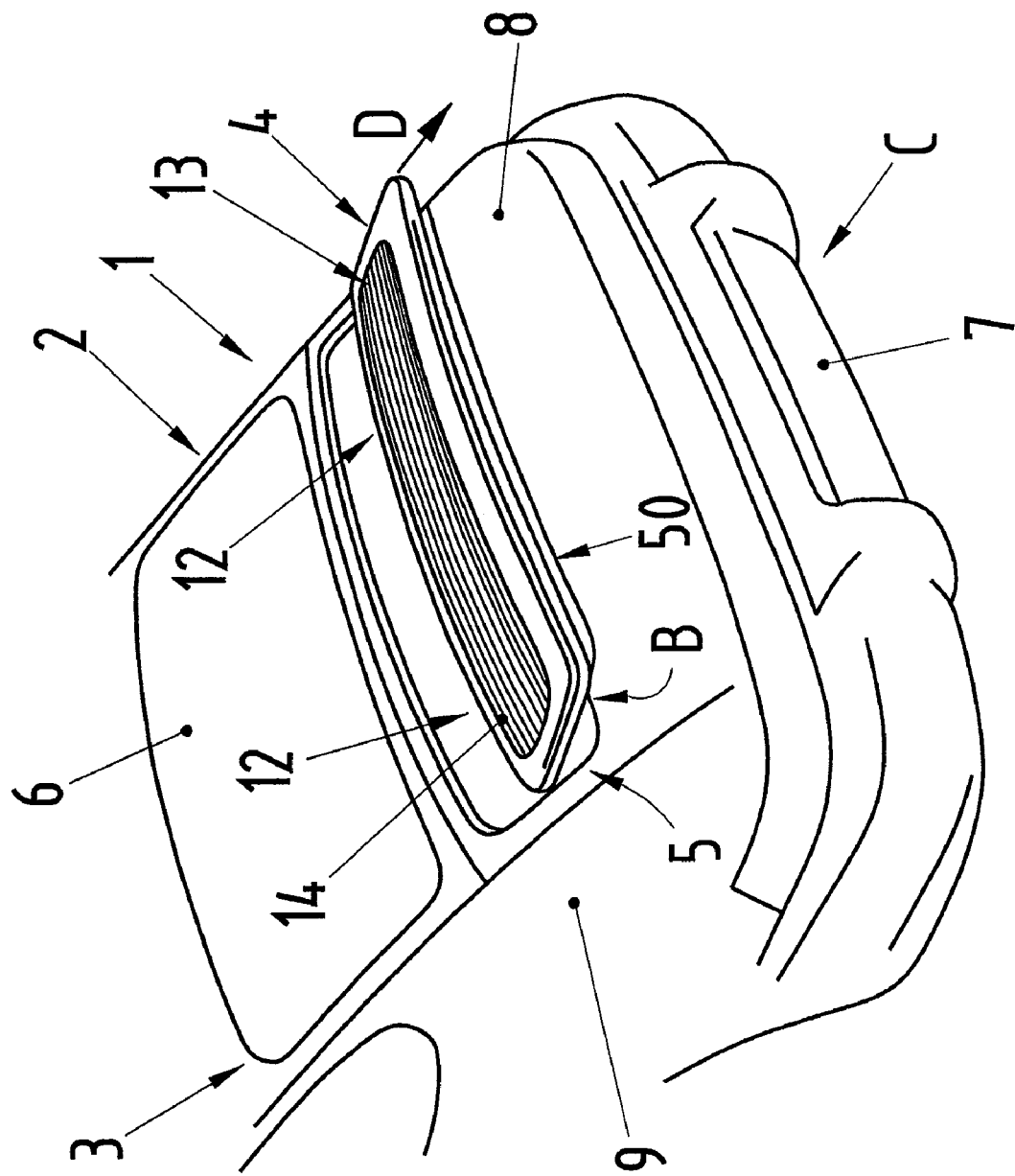
FIG. 1 shows a diagonal perspective view of a rear area of a motor vehicle having an air-conducting device.

In the exemplary embodiment shown, a motor vehicle 1 includes a vehicle body 2 with an air-conducting device 4 arranged in its rear area 3. The air conducting device 4 can be moved by way of an adjusting mechanism 5 from a rest position A, in which the air conducting device is arranged flush with the adjacent body 2, into a driven-out operating position B. Because of the air-conducting device 4, on one hand the air resistance coefficient of the motor vehicle 1 is reduced and, on the other hand, the dynamic rear wheel pressure is increased during the driving operation (output drive).

In the rear area 3, the body 2 is composed of a rear window 6, a bumper 7 and a rear lid 8, which are arranged between side panels 9. The rear lid 8, which is made up of an outer part and an inner reinforcement frame, has an approximately rectangular opening 12, into which the air-conducting device 4 is installed. In the rest position A, the air-conducting element 50, which is designed as a flap and/or spoiler, runs flush with the outer skin along the contour of the rear area 3 (designed as a hatchback) while, in contrast, in operating position B, it is swiveled out of the body plane such that its exterior flow surface is adjusted so it is approximately horizontal. At the same time, the air-conducting element 50 is slid opposite the driving direction C downward by a dimension D. The air-conducting element 50 has a large-surface air inlet grid 13 that has several transverse struts 14.

Figure 2:
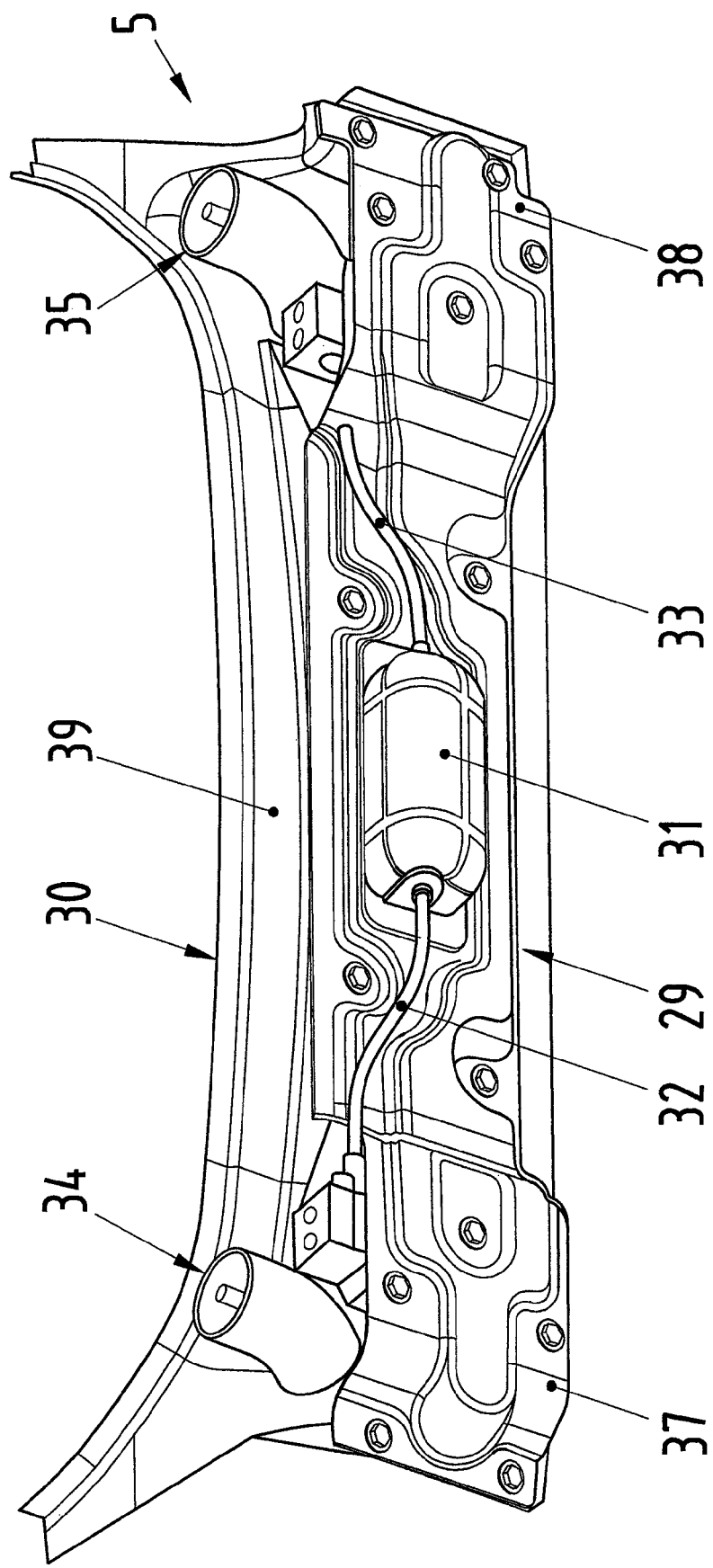
FIG. 2 shows an arrangement of the drive for the air-conducting device according to FIG. 1.
Figure 3:
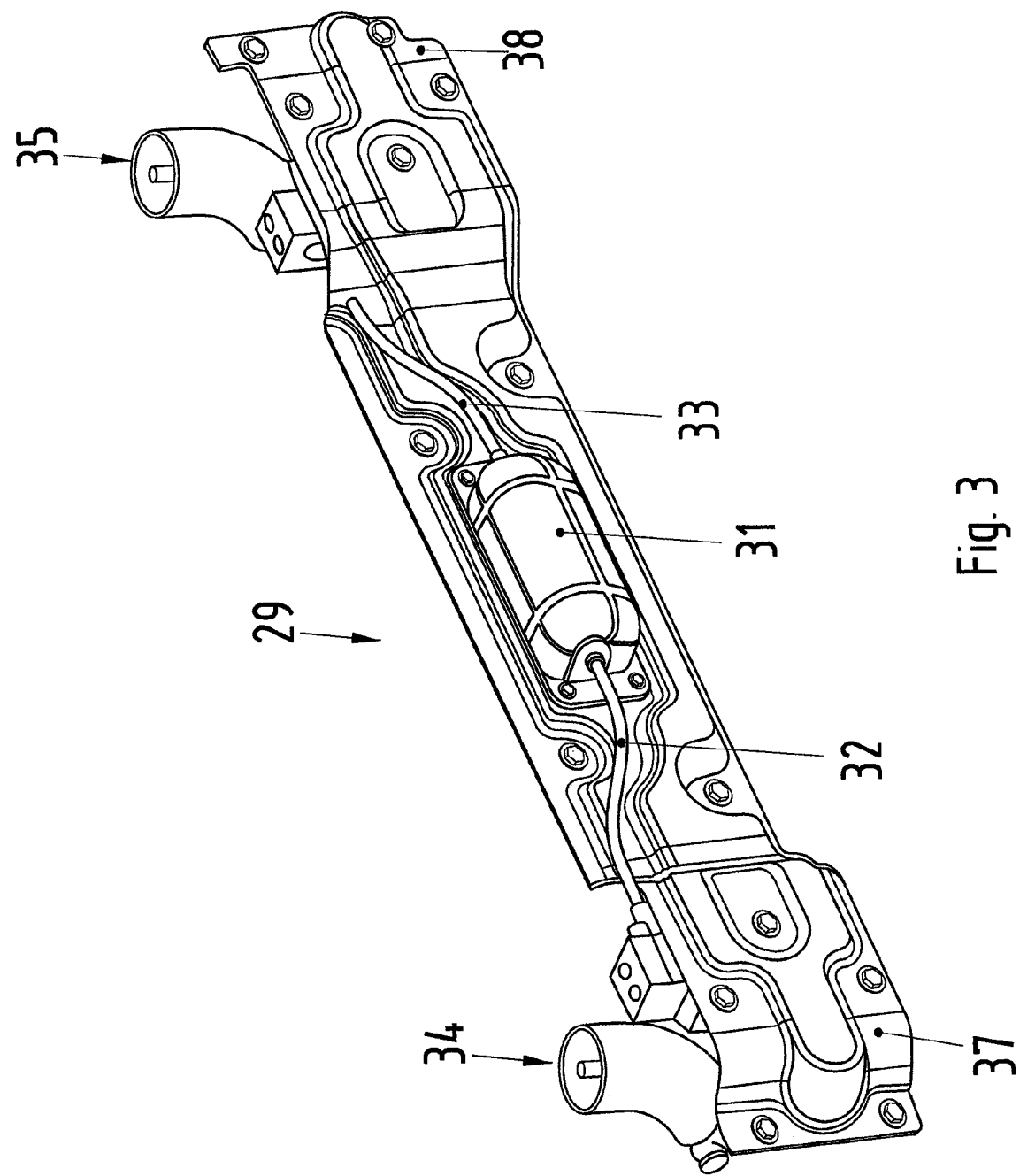
FIG. 3 shows a bearing part for the drive according to FIG. 2.

Under the rear lid 8—as can be seen from FIGS. 2 and 3—a cross-member 30 is arranged, on which the adjusting mechanism 5 is fastened by way of a bearing part 29. The adjusting mechanism 5 includes an electric motor 31 that is fastened approximately in the middle on an outward facing side of the bearing part 29. The electric motor 31 drives two openers 34 and 35 arranged on the sides of the vehicle by way of flexible shafts 32 and 33.

In its cross section, the bearing part 29 has a profiled curve. In the outer edge area, U-profiles 37 and 38 are provided that open towards the cross-member 30. Both U-profiles 37, 38 are connected to each other by a section 39 that is essentially flat.

Together with the cross-member 30, the U-profiles 37, 38 each define an open space to the left and right of the air-conducting element 50, in which space the openers 34 and 35 are housed.

Figure 4:
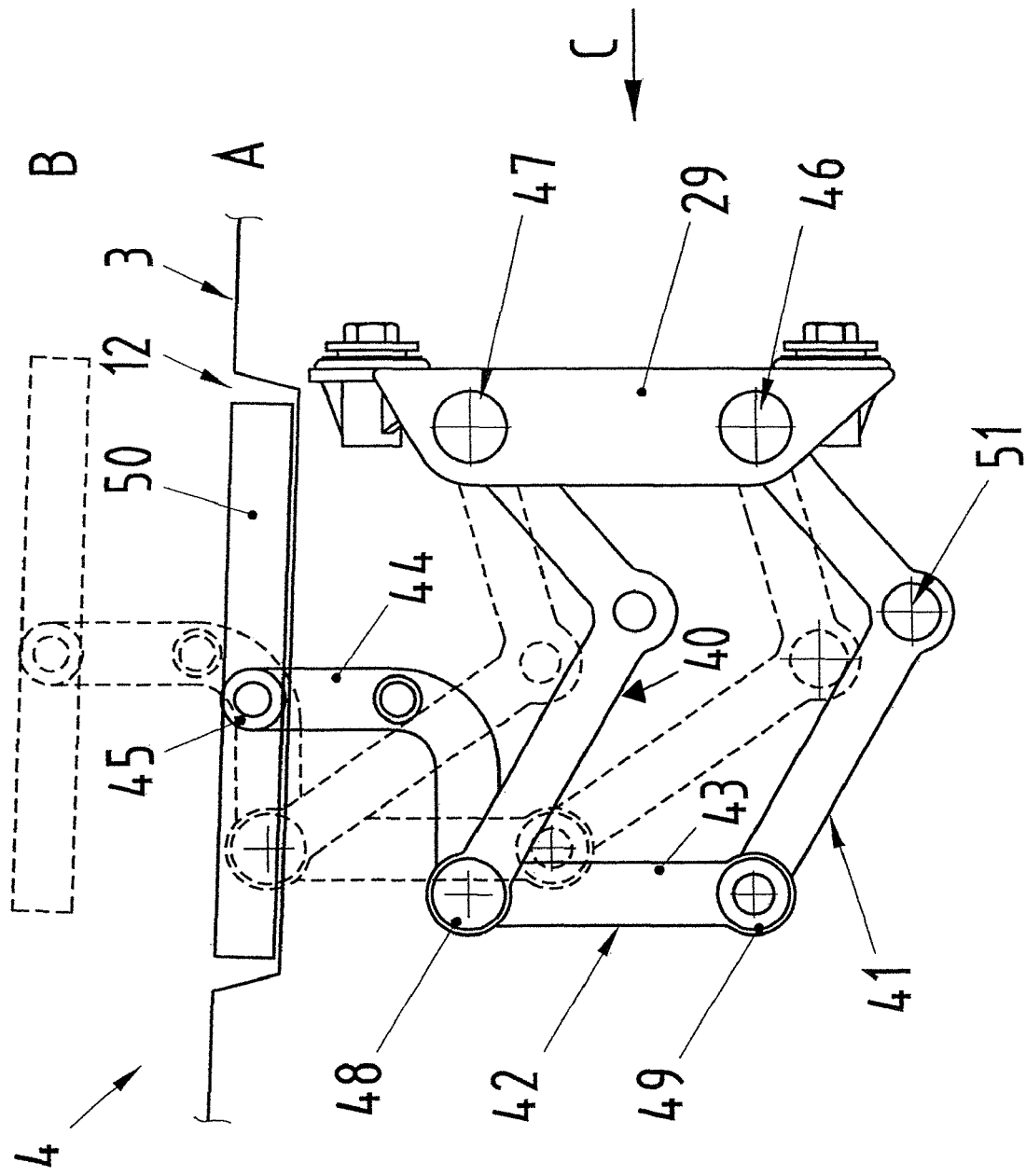
FIG. 4 shows the drive kinematics of the drive for the air-conducting device.

The kinematics of openers 34 and 35 are explained in greater detail with respect to FIG. 4. The kinematics involve a standing quadruple joint having two control arms 40 and 41 that are hingedly-mounted fixed to the vehicle. The articulated connection of control arms 40 and 41 occurs due to swivel joints 46 and 47, respectively, which are arranged vertically over each other on the bearing part 29. The two control arms 40 and 41 are connected to each other by a connecting element 42 so that they are hinged with respect to each other by means of swivel joints 48 and 49. For this purpose, connecting element 42 has a coupler 43, which turns into a curved bracket 44 above the swivel joint 48 of the control arm 40. The curved bracket 44 is connected to the air-conducting element 50 at a fastening point 45.

The kinematic system is driven from a toggle joint (not shown) that engages at the lower apex 51 of the control arm 41. This is connected by a nut to a threaded spindle (not shown) that is positioned in the vehicle vertical direction, which spindle is driven by the flexible shaft 32 and which ensures the positioning of the rear spoiler because via self-locking due to its threads or its material construction.

Because of the vertical attachment of control arms 40 and 41 on the bearing part 29, the result is that the construction space in the vertical direction of the vehicle can be reduced in comparison to a linear opener.

Figure 5:
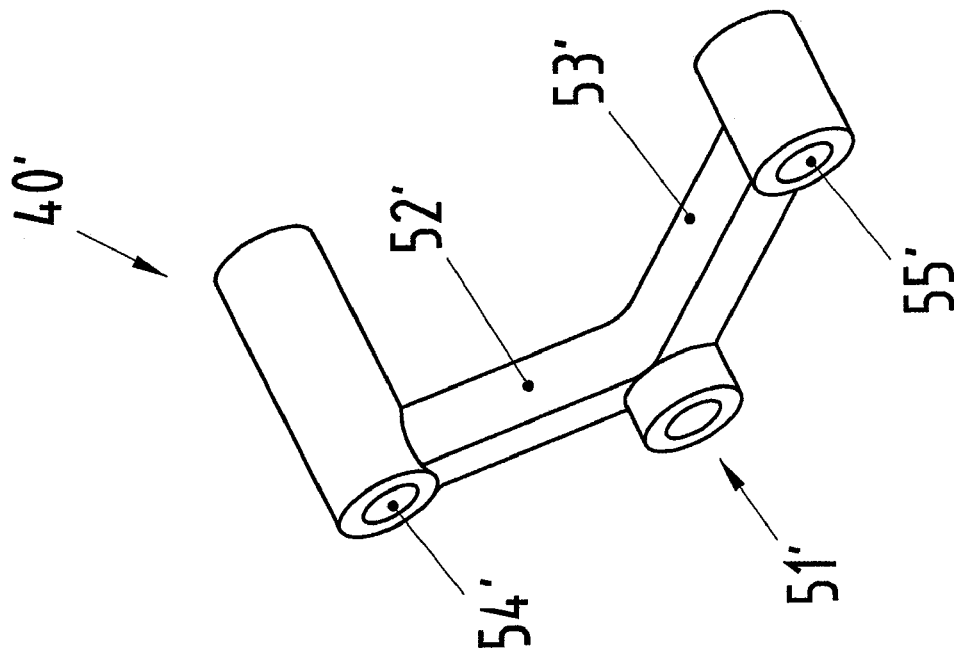
FIG. 5 shows two control arms according to FIG. 4.
Figure 5:
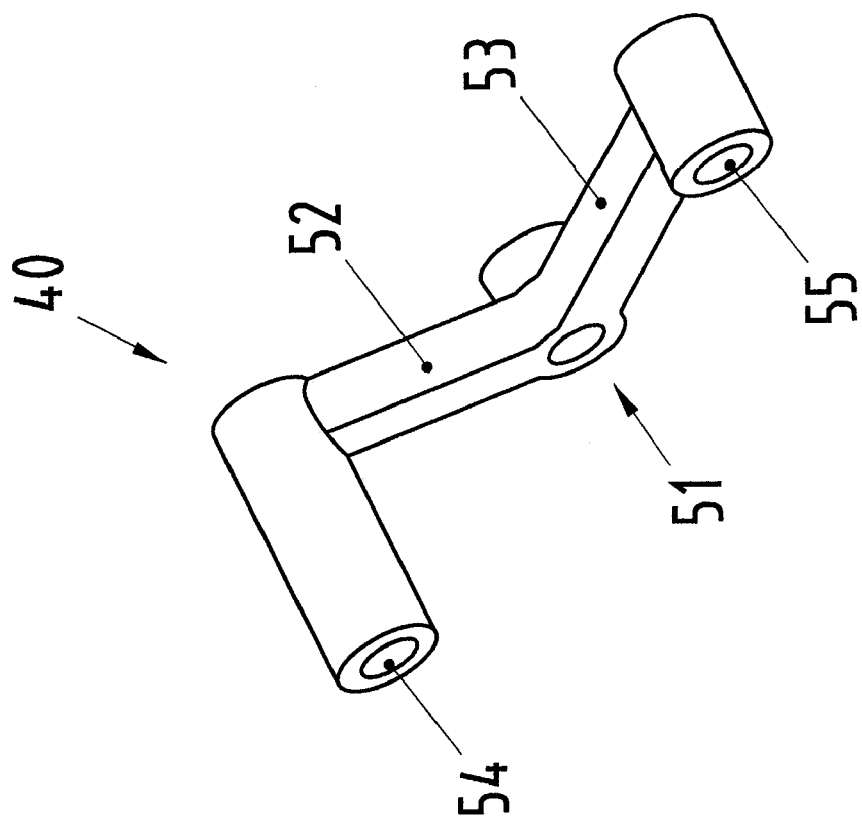

The geometry of the two control arms 40 and 41 can be seen from FIG. 5. In FIG. 5, the left illustration shows the corresponding control arm 40 that is provided on the right side of the vehicle at opener 35 and the right illustration shows the corresponding control arm 40' that is provided on the left side of the vehicle at opener 34. As can be seen, the control arms 40 and 40' have mirror-symmetrical structure so installation on opposite sides is possible. Thus, the number of manufacturing tools can be halved.

Each control arm 40 has two shanks 52 and 53, into the apex 51 of which the toggle levers for the drive can engage, depending on the installation position. On the free ends of shanks 52 and 53, hollow cylindrical bearing mounts 54 and 55 are formed, through which a bolt assigned either to the bearing part 29 or the connecting part 42 passes and thus forms the respective pivot joint.

Because of a fixed threaded connection of the bearing part 29 with the cross-member 30 and its rigid design, an additional increase in the torsional stiffness of the vehicle can be achieved.

Figure 7:
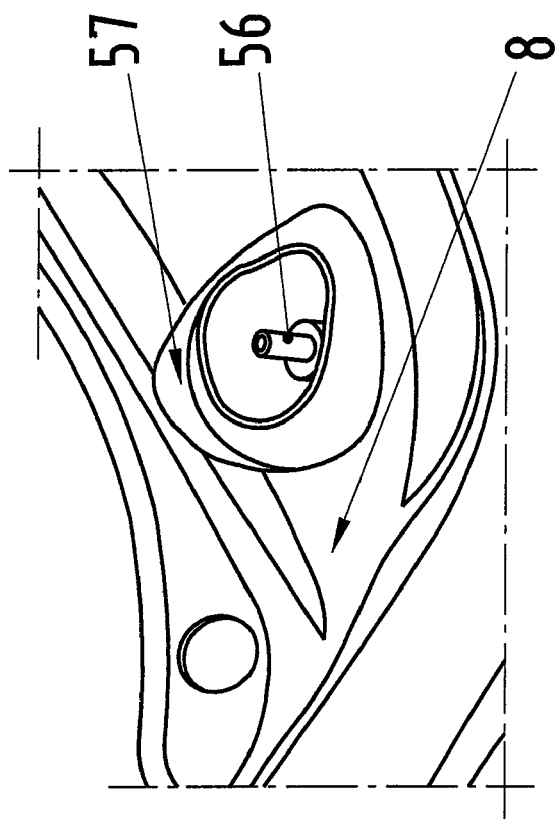
FIG. 7 shows a diagonal view according to FIG. 1 without air-conducting elements.
Figure 6:
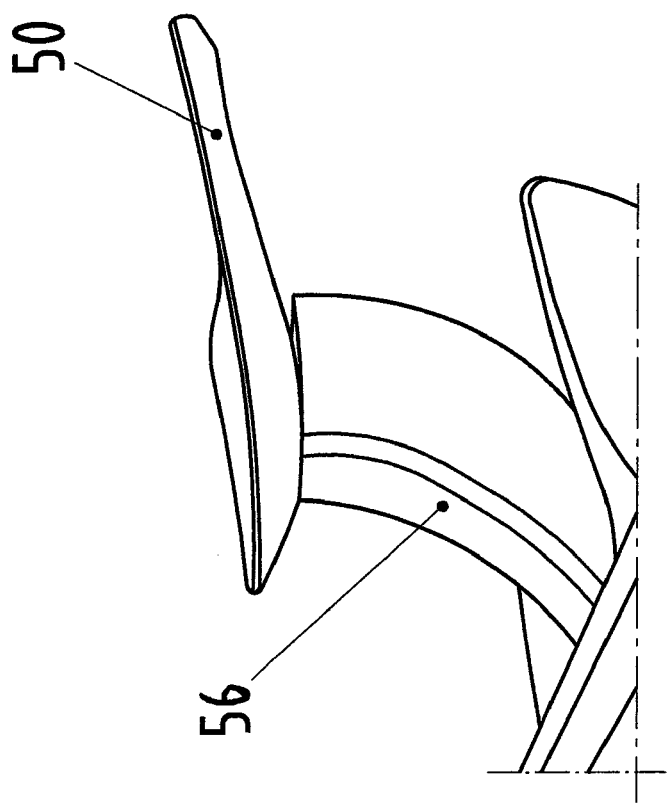
FIG. 6 shows a connecting element for the air-conducting element.

The connecting element 42 that connects the two control arms 40 and 41 is surrounded by a specially formed spoiler foot 56. As can be seen from FIGS. 6 and 7, the spoiler foot 56 is a hollow plastic part having a non-uniform cross section. In this exemplary embodiment, the cross section contour is similar to a cone section, especially of an oblique circular cone. The bracket 44 of the connecting element 42 extends inside the hollow spoiler foot 56.

In order to achieve a uniform joint curve at the outlet openings 57 with respect to the surrounding body components, especially the rear lid 8, the geometry of the spoiler feet 56 is adapted to the path line of the kinematics. This ensures that during the entire driving-out process of the air-conducting element 50, no position-dependent joint pattern occurs.

The use of the air-conducting device described above is to be considered independently, no matter whether the air-conducting device is used to reduce the air resistance coefficient or increase the dynamic rear wheel pressure. Naturally, the air-conducting device according to the invention can be mounted on vehicles having a rear engine and, additionally, intake openings can be provided for supplying cooling air to the engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a rear area, the motor vehicle comprising:
    an air conducting device operatively arranged in the rear area;
    an adjusting mechanism operatively configured to move the air-conducting device from a rest position in which the air-conducting device is flush with an adjacent body of the rear area into a driven-out operating position;
    wherein the adjusting mechanism comprises two openers arranged in side areas of the air-conducting device for moving the air-conducting device; and
    a bearing part fastened to the vehicle in a substantially perpendicular alignment to the adjacent body, each opener being connected in a swivel-jointed manner on the bearing part.

2. The motor vehicle according to claim 1, further comprising a rear lid rearward of the air conducting device and a cross-member arranged under the rear lid of the rear area of the vehicle, the bearing part being fastened on the cross-member and rearward of the air conducting device.

3. The motor vehicle according to claim 1, wherein the adjusting mechanism further comprises a drive unit, the drive unit being fastened on the bearing part.

4. The motor vehicle according to claim 3, wherein the drive unit is an electric motor.

5. The motor vehicle according to claim 4, wherein the electric motor is operatively coupled to the openers via flexible shafts.

6. The motor vehicle according to claim 2, wherein lateral side areas of the bearing part are operatively configured to open toward the cross-member, one opener being held in each lateral side area.

7. The motor vehicle according to claim 3, wherein lateral side areas of the bearing part are operatively configured to open toward the cross-member, one opener being held in each lateral side area.

8. The motor vehicle according to claim 5, wherein lateral side areas of the bearing part are operatively configured to open toward the cross-member, one opener being held in each lateral side area.

9. The motor vehicle according to claim 1, wherein each of the two openers comprise two control arms, a first end of each of the control arms being fastened via a first swivel joints to the bearing part and, a second end of each of the control arms being coupled via a second swivel joints to a connecting element.

10. The motor vehicle according to claim 7, wherein each of the two openers comprise two control arms, a first end of each of the control arms being fastened via a first swivel joints to the bearing part and, a second end of each of the control arms being coupled via a second swivel joints to a connecting element.

11. The motor vehicle according to claim 9, wherein the connecting element corresponding to each opener is fastened on the air-conducting device.

12. The motor vehicle according to claim 10, wherein the connecting element corresponding to each opener is fastened on the air-conducting device.

13. The motor vehicle according to claim 11, wherein each connecting element fastened to the air-conducting device is covered by a spoiler foot.

14. The motor vehicle according to claim 12, wherein each connecting element fastened to the air-conducting device is covered by a spoiler foot.

15. The motor vehicle according to claim 13, wherein the spoiler foot has a geometric shape adapted to a kinematic movement path line of the openers.

16. The motor vehicle according to claim 1, wherein the motor vehicle is a passenger car.

17. A motor vehicle having a rear area, the motor vehicle comprising:
a rear lid in the rear area of the motor vehicle;
a cross-member arranged under the rear lid;
a bearing part substantially perpendicularly aligned to an adjacent body of the rear area and fastened on a front surface of the cross-member;
an air conducting device operatively arranged in the rear area of the motor vehicle and being movable from a rest position where the air-conducting device is flush with the adjacent body of the rear area of the motor vehicle and forward of the rear lid and a driven-out operating position where the air conducting device is spaced outwardly from the adjacent body of the rear area of the motor vehicle and rearward of the first position; and
an adjusting mechanism operatively configured to move the air conducting device from the rest position to the driven-out operating position, the adjusting mechanism comprising two openers arranged at side areas of the air-conducting device, each of the openers comprising two control arms, each of the control arms having a first end pivotally connected to the bearing part at a first swivel joint and a second end remote from the first end, each of the openers further comprising a connecting element pivotally connected to the respective second ends of the control arms at second swivel joints and further being connected to the air conducting device, whereby driving forces applied to the control arms move the air conducting device upwardly and rearwardly from the rest position to the driven out position or inwardly and forwardly from the driven-out position to the rest position.

* * * * *